July 19, 1960 B. J. McCOLL Re. 24,846

LOG TRANSPORTING VEHICLE

Original Filed March 25, 1954 3 Sheets-Sheet 1

INVENTOR
Bruce J. McColl

By J. Frederick Bechtel
Attorneys

LOG TRANSPORTING VEHICLE

Original Filed March 25, 1954 3 Sheets-Sheet 2

INVENTOR
Bruce J. McColl
By J. Frederick Bechtel
Attorneys

LOG TRANSPORTING VEHICLE

Original Filed March 25, 1954 3 Sheets-Sheet 3

INVENTOR
Bruce J. McColl
By J. Frederick Bechtel
ATTORNEYS

United States Patent Office

Re. 24,846
Reissued July 19, 1960

24,846

LOG TRANSPORTING VEHICLE

Bruce J. McColl, Strathmore, Quebec, Canada, assignor to Clark Equipment Company, Buchanan, Mich., a corporation of Michigan Original No. 2,720,988, dated Oct. 18, 1955, Ser. No. 418,493, Mar. 25, 1954. Application for reissue Sept. 16, 1957, Ser. No. 684,382

Claims priority, application Canada Mar. 25, 1953

9 Claims. (Cl. 214—77)

Figure 1:
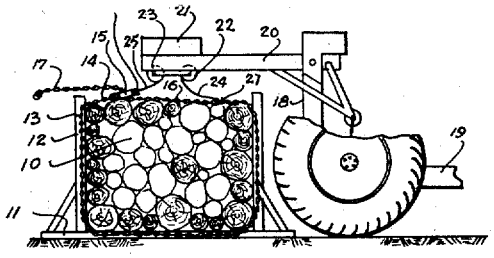

Matter enclosed in heavy brackets [ ] appears in the original patent but forms no part of this reissue specification; matter printed in italics indicates the additions made by reissue.

This invention relates to an improved load transporting device which is particularly adapted for loading, transporting and unloading logs.

A problem is presented by the necessity of finding economical and satisfactory means for transferring a pile of logs from the stump in the bush where the tree is felled, the branches stripped, and the tree is bucked up into a pile, to the main haul roads. These piles are usually about ¾ to 1½ cords and consist of 4 foot bolts stacked on parallel skids with a supporting stake at each end. The pre-haulers, which have previously been used to carry these piles along the strip road to the main haul roads have been subject to the disadvantages of requiring an excessive loading time and have either been of costly construction or have failed to hold the wood securely, thereby causing the load to break before the main haul road is reached with consequent loss of time on reloading.

The object of this invention is to provide a load transporting vehicle in which a pile of wood can rapidly and conveniently be transferred to the vehicle.

A further object of this invention is to provide a load transporting vehicle which includes means for tightening up the slings placed around a rectangular pile of bolts so that the pile can be transported as a substantially circular bundle.

The manner in which these and other objects are achieved will be apparent from the following description of the preferred embodiment of this invention, and from the appended claims.

Figure 2:
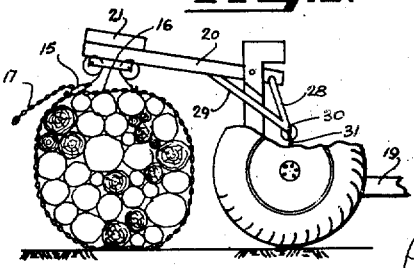
Figure 4:
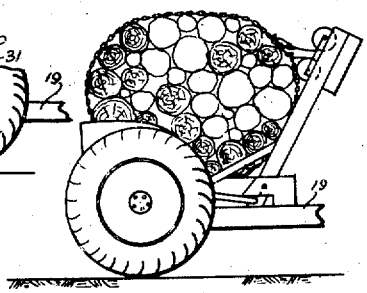
Figure 3:
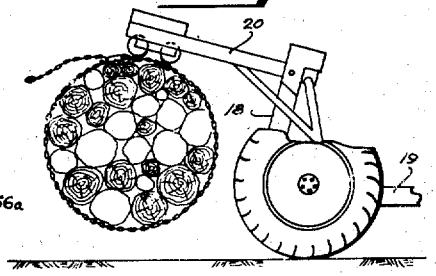
Figure 7:
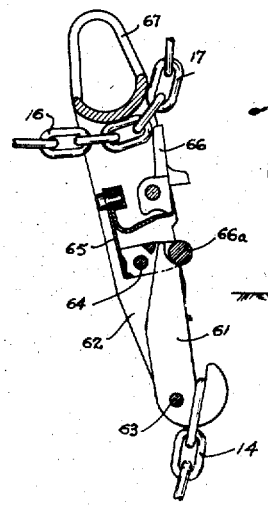
Figure 5:
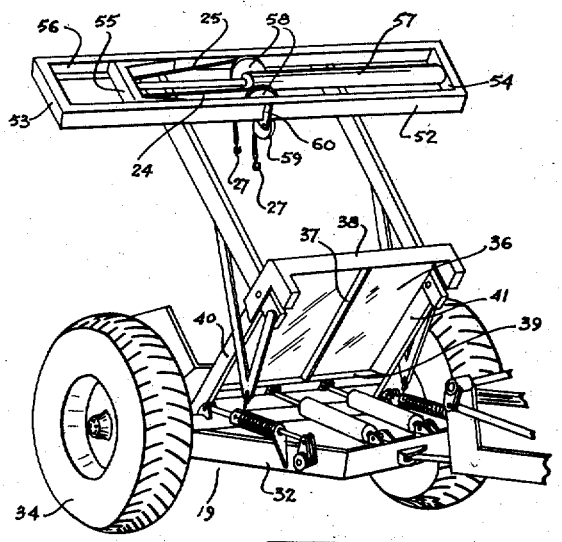
Figure 6:
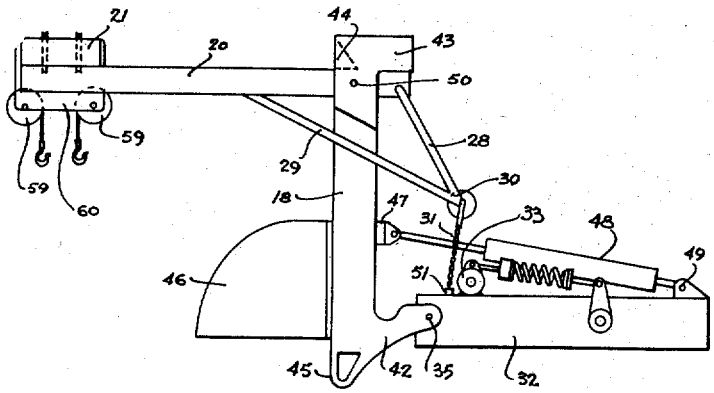
Figure 8:
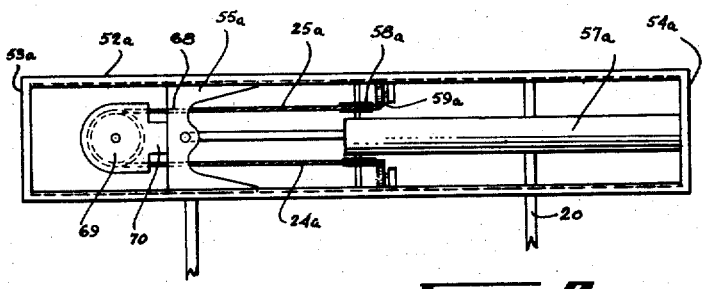

In the drawings which illustrate the preferred embodiment of this invention:

Figure 1 is an elevation view illustrating the load transporting vehicle in position prior to the loading of the pile, Figure 2 is a view similar to Figure 1 in which the sling has been tightened about the pile, Figure 3 is a view similar to Figures 1 and 2 showing the bundle partly loaded onto the vehicle, Figure 4 is a view similar to the previous figures showing the bundle loaded onto the vehicle, Figure 5 is a perspective view of the load transporting vehicle, Figure 6 is a side elevation view in which one of the wheels has been removed for clarity of illustration, Figure 7 is a detailed view of the grip sling means, and Figure 8 is a detailed plan view of a cross-head construction in accordance with an alternative embodiment.

Referring now to Figures 1 to 4 inclusive, Figure 1 shows a rectangularly shaped pile of pulpwood bolts 10 mounted on a pair of parallel skids 11 and supported at each end by stakes 12. A sling 13 is preferably a chain sling which encircles the pile. This sling is placed in position by being drawn under the pile by a wire left there for that purpose when the wood was piled or alternatively a long steel rod with a hook at its end, known as a canary, may be used. One end 14 of the sling is secured to a grip sling block 15. The other end portion 16 of the sling is passed through the grip sling block to leave a free end 17. Grip sling block 15, shown in detail in Figure 7, will permit end portion 16 being drawn through it to tighten the pile but will grip the sling to prevent end portion 16 being drawn in an opposite direction to loosen the pile.

The load transporting vehicle, a portion of which is shown in Figures 1 to 4 inclusive includes a platform 18 pivotally mounted on the chassis 19 of the vehicle and a loading arm 20 pivotally mounted at the upper end of platform 18. At the rearwardly extending end of loading arm 20 is disposed a cross-piece 21 within which are mounted sheaves 22 and 23. Wire ropes 24 and 25 are passed over sheaves 22 and 23 respectively. An open hook 26 at the end of rope 25 engages grip sling block 15 and a grab hook 27 at the end of rope 24 engages the sling at a point adjacent to end 16 but spaced from grip sling block 15. As will subsequently be explained in detail cross-head 21 includes means for tensioning ropes 24 and 25 to draw hooks 26 and 27 towards each other. If desired balls may be added immediately above each hook to prevent any possibility of the hooks jamming in the sheaves.

Figure 2 illustrates the effect of drawing hooks 26 and 27 together. The pile changes from the rectangular shape shown in Figure 1 to the substantially circular or oval shape shown in Figure 2, *the greater height of the pile in the circular or oval shape pushing the arm 20 upwardly as shown in the latter figure.* The sling at end 16 will become slack. This slack can be taken up by hand, by pulling free end 17 of the sling to draw more of the sling through the grip sling block 15. [It will be noted that whereas loading arm 20 is shown as being substantially horizontal in Figure 1 it is upwardly inclined in Figure 2 to give increased height to cross-head 21 so as to accommodate the increased height of the pile when the pile is in the form of a substantially circular bundle.] In the preferred embodiment [this] *of the invention the increased height of loading arm 20 as shown in Figure 2* is achieved by pivoting loading arm 20 freely with respect to platform 18 so that it can be swung from a position in which loading arm 20 is perpendicular to platform 18 as shown in Figure 1 to a position in which the loading arm makes an obtuse angle with the platform. Lever arms 28 and 29 are attached to lever arm 20 at spaced points and extend forwardly and downwardly. The lower [end] *ends* of these lever arms are secured together at 30. A chain 31 is secured to lever arms 28 and 29 at point 30 and, as well be explained in detail, acts to swing loading arm 20 towards its obtuse angled position with respect to the platform *as the latter is pivoted forwardly.* The use of chain 31 permits cross-head 21 freely to ride upwardly *while the platform 18 remains vertical* to accommodate the increased height of pile 10, *as in Figure 2.* If chain 31 is replaced with a rigid connection the height of cross-head 21 can be increased by tilting platform 18 forwardly by a small angle.

Figure 3 shows the bundle in the process of being transferred into loading position on the vehicle. Platform 18 is pivoted forwardly with respect to the vehicle, the slack in chain 31 due to the elevation of cross-head 21 [allows] *allowing* the loading arm 20 to return to a position perpendicular to platform 18. [When] *As* platform 18 [has been] *is* pivoted [forward to] *forwardly toward* an almost horizontal position as illustrated in Figure 4 the forward movement of platform 18 causes a tensioning of chain 31. Lever arms 28 and 29 therefore act to pivot loading arm 20 in a continuous movement ending in its extreme obtuse angled position with respect to the loading platform as illustrated in Figure 4. This forward swinging of the loading arm 20 which occurs simultaneously with the pivoting of platform 18 causes bundle 10 to be *raised and* transferred to a position in which it is securely resting on platform 18. In addition by moving the load to a more forward position in the vehicle than would result if this feature were omitted, a better balanced distribution of the weight of the load is obtained. Due to the substantially circular or oval shape of the load there is substantially no loss of space due to the obtuse angled relationship between loading arm 20 and platform 18 in its final loaded position.

Further details of the load transporting vehicle will be apparent from Figures 5 and 6. The vehicle comprises a chassis 19 which includes frame members 32, wheel axle casing 33 and wheel 34. The vehicle may be mounted on a pair of wheels to provide a trailer attachment to another vehicle such as a tractor. Alternatively two pairs of wheels may be used, or as illustrated in Figures 5 and 6 it may be the rear portion of an articulated vehicle. Platform 18 is pivotally mounted on frame 32 by pivot pins 35. Platform 18 includes a base plate 36, a central frame member 37, an upper end frame member 38, a lower end frame member 39 and side frame members 40 and 41. Side frame members 40 and 41 include laterally extending portion 42 at their lower end to provide for the pivotal mounting of the platform. At the top of each side frame member of the platform there is a forwardly extending portion 43 which abuts the forward end of loading arm 20 to give a stop limiting the pivotal movement of the loading arm in one direction to a perpendicular angle between the loading arm and the platform. An inclined surface 44 shown by dotted lines in Figure 6 limits the obtuse angle to which loading arm 20 can be pivoted. Loops 45 provide a downward extension for loading platform 18. Guides 46 extend on each side of the loaded bundle to prevent interference between the load and the wheel.

Loading platform 18 also includes a cross-frame member 47. Double acting hydraulic cylinders 48 which are mounted at 49 on framework 32 act against frame member 47 to pivot platform 18.

Loading arms 20 are pivotally mounted with respect to platform 18 by pivot pins 50. Lever arms 28 and 29 are secured to loading arms 20 and are joined together at 30 as has previously been stated. Chain 31 is anchored to the main chassis framework at 51. As platform 18 swung forwardly, a chain 31 is wrapped around axle casing 33. This causes chain 31 to be tensioned and act to pivot lever arm 20 towards the obtuse position with respect to the loading platform illustrated in Figure 4.

Cross-head 21 includes side pieces 52 and end pieces 53 and 54. Cross-piece 55 is slidably mounted in groove 56 which extends along the interior surface of each of side pieces 52. A hydraulic cylinder 57 is anchored against end piece 54 and acts to push cross-piece 55 towards end 53. Ropes 24 and 25 are connected to cross-piece 55 and are tensioned by the movement of cross-piece 55 toward end piece 53. These ropes pass over a pair of sheaves 58 which are mounted with their axes parallel to end pieces 53 and 54. The ropes then pass over another pair of sheaves 59 which are supported by blocks 60 and which have axes parallel to side pieces 52 thus there is provided means for drawing hooks 26 and 27 towards each other to tighten up the sling in the manner previously described.

Figure 7 is a detail view of the grip sling block. One end of the sling 14 is attached to a hook 61 which is pivotally mounted on the main block 62 by pivot pin 63. This hook is tripped by upward movement of catch 66A.

Catch 66A is pivoted at 64 and normally held in locking position by spring 65. A blow with a hammer or rod against catch 66A acts to release 61 to free the sling from the bundle of bolts. A chain pawl 66 permits chain 16 to pass through the grip sling block in one direction but locks the chain to prevent movement in an opposite direction. A loop 67 is provided for engagement by open hook 26. The grip sling block apart from loop 67 is of standard design.

Figure 8 shows a cross-head construction in accordance with another embodiment of this invention to provide for equalized sling tension. The cross-head, shown in Figure 8 comprises grooved side pieces 52a joined by end pieces 53a and 54a. A hydraulic cylinder 57a acts on cross-piece 55a to tension wire ropes 24a and 25a which pass over sheaves 58a and 59a. In this embodiment ropes 24a and 25a are connected together in the form of a continuous length instead of being two separate pieces. The continuous rope passes through apertures 68 in cross-piece 55a and over a sheave 69, mounted by sheave head 70 on cross-piece 55a. Sheave 69 is free to rotate to equalize the tension between ropes 24a and 25a during tightening or loosening of the sling.

It will be appreciated from the foregoing that a log transporting vehicle in accordance with this invention provides a highly practical and convenient means for achieveing the objects set forth.

I claim:

1. In a vehicle for loading and transporting a rectangularly stacked pile of articles, a sling adapted to be passed around said articles, grip sling means attached to one end of said sling and adapted to grip the sling adjacent to the other end thereof so as to permit movement of said other end of the sling in one direction to tighten the sling around the pile while preventing movement of said other end of the sling in a direction opposite to said one direction, a loading arm on said vehicle, sling tightening means at the end of said loading arm, said sling tightening means including means for engaging said grip sling means, means for engaging a portion of said sling spaced from said grip sling means in a direction away from said other end, and means for drawing said means engaging the grip sling means and said means engaging a portion of said sling together to tighten the sling, said means for drawing including a cross-head mounted at the end of the loading arm, sheaves mounted in the cross-head, said means for engaging the grip sling means passing over one of said sheaves and said means for engaging a portion of the sling passing over another of said sheaves, and a hydraulically actuated piston adapted to move each of said engaging means in a direction away from said sheaves to tighten said sling, said hydraulic piston being anchored at one end of said cross-head, a cross-piece slidably mounted adjacent to the other end of said cross-head, each of said engaging means being attached to said cross-piece and said hydraulic piston acting to move said cross-piece towards said other end to tighten the sling, said sheaves including two pairs of sheaves one of which pairs is mounted with its axis perpendicular to the direction of movement of said cross-piece and the sheaves of the other pair being mounted with their axes parallel to the direction of movement of said cross-piece, each of said engaging means passing from the cross-piece over one of the sheaves having its axis perpendicular to the direction of movement of the cross-piece and then over one of the sheaves having its axis parallel to the direction of movement of the cross-piece, and means for moving said loading arm to transfer said pile into load transporting position on the vehicle.

2. In a load transporting vehicle, an undercarriage, a platform pivotally mounted at its lower end on said undercarriage, means for moving said platform between an upright position and a forwardly inclined position, a loading arm pivotally mounted at the other end of said platform and extending rearwardly therefrom when said platform is upright, means for moving said loading arm between a position in which the loading arm is perpendicular to said platform and a position in which the loading arm makes an obtuse angle with said platform, said loading arm being perpendicular to the platform when the platform is upright and at an obtuse angle therewith when the platform is forwardly inclined and load engaging means at the end of said loading arm, said load engaging means comprising a sling adapted to be passed around a pile of articles, grip sling means attached to one end of said sling and adapted to grip the sling adjacent to the other end thereof so as to permit movement of said other end of the sling in one direction to tighten the sling around the pile while preventing movement of said other end of the sling in a direction opposite to said one direction, sling tightening means at the end of said loading arm including means for engaging said grip sling means, means for engaging a portion of said sling spaced from said grip sling means in a direction away from said other end, and means for drawing said means for engaging the grip sling means and said means engaging a portion of said sling together to tighten the sling.

*3. A load handling and transporting vehicle comprising, a chassis, and upwardly disposed platform having upper and lower ends and pivotally mounted adjacent its lower end on said chassis, means for moving said platform between an upright position and a forwardly directed position, a loading arm pivotally mounted at the other end of said platform and extending rearwardly from the platform at an angle therewith when the platform is in its upright position, the said loading arm being maintained at the said angle during a portion of the movement of said platform between its upright position and its forwardly directed position, and means operative during the latter portion of the said movement of the platform for moving said loading arm with respect to the said platform from the said angle to a larger obtuse angle as the platform is moved to its said forwardly directed position, and load engaging means adjacent the outer end of the said loading arm.*

*4. In a load transporting vehicle, a chassis, a platform having upper and lower ends and pivotally mounted at its lower end on the said chassis, means for moving said platform between an upright position and a horizontally disposed forwardly directed position, a loading arm pivotally mounted at the upper end of said platform and extending rearwardly therefrom at a predetermined minimum angle when said platform is upright, stop means maintaining the said predetermined minimum angle when the said platform is upright and during the initial portion of movement of said platform between its upright position and its horizontally disposed forwardly directed position, and additional means for increasing the angle between the said loading arm and the said platform during the latter portion of the said movement of the loading platform whereby to dispose the loading arm in a forwardly extending position when the platform is in its forwardly directed position.*

*5. A load transporting vehicle as in claim 4 in which the means for increasing the angle between the said loading arm and said platform includes a forwardly extending lever arm connected to the loading arm and a connecting member between said lever arm and said chassis, said connecting member being tensioned to pivot said loading arm with respect to said platform upon forward pivotal movement of the platform.*

*6. A load transporting vehicle as in claim 5 in which the said chassis has an upward projection thereon and the said connecting means comprises a chain adapted to partially wrap around the said upward projection as said platform is pivoted forwardly.*

*7. In a load transporting vehicle, a chassis, an upwardly disposed platform having upper and lower ends and pivotally mounted adjacent its lower end on the said chassis, means for moving said platform between an upright position and a horizontally disposed forwardly directed position, a loading arm pivotally mounted adjacent the upper end of said platform and extending rearwardly therefrom when said platform is upright, stop means on the said platform limiting downward movement of the said loading arm when the platform is in the said upright position and additional means including flexible tension means connected between the said loading arm and the said chassis permitting the rearward end of the loading arm to be pivoted upwardly while the said platform remains unmoved in its upright position, said additional means providing also for increasing the angle between the said loading arm and the said platform as the platform moves forwardly from the said upright position whereby to dispose the loading arm in a forwardly extending position when the platform is in its forwardly directed position.*

*8. A load handling and transporting vehicle comprising, a chassis, an upwardly disposed platform having upper and lower ends and pivotally mounted adjacent its lower end on said chassis, a loading arm pivotally mounted at the other end of said platform and extending rearwardly from the platform at an angle therewith when the platform is in an upright position, a lever arm connected to the said loading arm and extending forwardly therefrom and projecting forwardly of the said platform when the platform is in the said upright position, a flexible tension member connected between the said lever arm and the said chassis, the said lever arm and said flexible tension member permitting the outer end of the said loading arm to be pivoted upwardly while the said platform remains unmoved in its upright position, and means for moving said platform between the said upright position and a forwardly directed position, the said lever arm and the said flexible tension member being arranged to move the loading arm with respect to the said platform from the said angle to a larger obtuse angle as the patform is moved to its said forwardy directed position.*

*9. A load handling and transporting vehicle comprising, a chassis, an upwardly disposed platform having an upper end and a lower end and pivotally mounted adjacent its lower end on said chassis, a loading arm pivotally mounted at the other end of said platform and extending rearwardly from the platform at an angle therewith when the platform is in an upright position, a stop on the said loading platform preventing the said loading arm from pivoting below a predetermined position, a forwardly extending lever arm connected to the said loading arm and extending forwardly of the said platform when the platform is in an upright position, a flexible tension member connected between the said lever arm and the said chassis, the said lever arm and the said flexible tension member permitting the outer end of the said loading arm to be pivoted upwardly while the said platform remains unmoved in an upright position, means for moving the said platform between the said upright position and a forwardly directed position, means on the said chassis engaged by the said flexible tension member as said platform moves from an upright position toward the said forwardly directed position, the said last named means shortening the effective length of the said flexible tension member and thereby moving the said loading arm with respect to the said platform from the said angle to a larger obtuse angle as the platform is moved to the said forwardly directed position, and load engaging means adjacent the outer end of the said loading arm.*

References Cited in the file of this patent or the original patent

UNITED STATES PATENTS

| | | |
|---|---|---|
| 146,436 | Dilley | Jan. 13, 1874 |
| 1,559,959 | Haynes | Nov. 3, 1925 |
| 1,834,902 | Payzant | Dec. 1, 1931 |

(Other references on following page)

UNITED STATES PATENTS

| | | |
|---|---|---|
| 1,889,820 | Butts | Dec. 6, 1932 |
| 2,109,907 | Martin | Mar. 1, 1938 |
| 2,161,734 | Wheless | June 6, 1939 |
| 2,251,435 | Anthony | Aug. 5, 1941 |
| 2,298,166 | Richards | Oct. 6, 1942 |

| | | |
|---|---|---|
| 2,332,962 | Barrett | Oct. 26, 1943 |
| 2,411,821 | Choat | Nov. 26, 1946 |
| 2,550,185 | Busch | Apr. 24, 1951 |
| 2,643,012 | Wahl | June 23, 1953 |

FOREIGN PATENTS

| | | |
|---|---|---|
| 484,742 | Canada | July 8, 1952 |